United States Patent [19]
Kaufeldt

[11] 3,709,379
[45] Jan. 9, 1973

[54] ROBOT SYSTEM
[76] Inventor: Roland T. A. Kaufeldt, Stambanewagen 81-83, Huddinge, Sweden
[22] Filed: Feb. 17, 1971
[21] Appl. No.: 116,124

[30] Foreign Application Priority Data
Feb. 22, 1970 Sweden .................................. 2225/70

[52] U.S. Cl. .............................. 214/1 BB, 214/1 CM
[51] Int. Cl. .................................................. B25j 9/00
[58] Field of Search ............... 214/1 BC, 1 BB, 1 CM

[56] References Cited
UNITED STATES PATENTS
3,572,519   4/1969   Tezuka ............................. 214/1 BC
3,575,301   4/1971   Panissida ........................... 214/1 BC Primary Examiner—Gerald M. Forlenza
Assistant Examiner—George F. Abraham
Attorney—Alter, Weiss & Whitesel

[57] ABSTRACT

A system for accurately damping and thereafter stopping high-speed displacement of robot arms in individual directions with substantially no play simultaneously with transmission of a signal for initiating displacement of other robot arms during the damping.

8 Claims, 7 Drawing Figures

PATENTED JAN 9 1973 3,709,379

INVENTOR.
ROLAND T. A. KAUFELDT
BY

ROBOT SYSTEM

BACKGROUND OF THE INVENTION

1. Field of the Invention

This invention refers to a system for providing play-free mounting of movable robot units that are adapted to be displaced at high speed for example in the x, y and z directions of a Cartesian coordinate system, with each respective unit being connected to a pneumatic control cylinder, and for providing prompt and effective damping of the displacement movements as well as signaling during the damping motion.

2. Description of the Prior Art

So-called robots are presently being utilized to an increasing extent for performing definite functions in industrial processes. As an example, the robot may be adapted to seize an object and to displace it in one or more predetermined directions, for instance in the respective x, y or z direction. The robot may also be adapted to perform certain rotative movements. The movable units of the robot may be connected to pneumatic control cylinders for being operated by them. As the displacement rates are comparatively high it is essential that the movements of the units be damped very promptly and effectively so that the units actually stop where required at set stop devices. Furthermore, because of the high operating speed of the robot, a signal must be delivered from the respective movable unit to the control equipment before the movable unit has reached its stopping position so that a signal to the next unit may be sent out in time. In addition, it is of extremely great importance that the movable units of the robot be mounted without play so that highly stable mounting is achieved, irrespective of which types of forces that influence the unit.

The robot systems that have been utilized up to now do not exhibit the characteristics mentioned above. The movable units are not mounted with a sufficient degree of stability, nor is the damping of the movements of the various units sufficiently effective, and furthermore the signaling associated with the different movements also shows deficiencies.

SUMMARY OF THE INVENTION

The object of the instant invention is to provide a system by means of which the disadvantages mentioned above are avoided. Thus, the robot system of the invention is characterized substantially by each respective movable unit comprising an elongated internal tubular arm having quadrangular cross section, furthermore by each arm being mounted in a concentrical mating external quadrangular tube, with said mounting being accomplished by bearing means positioned at each end of the external tube between each of the four opposing surfaces of the external tube and the internal arm, respectively, and by the external tube being provided with a unit comprising a progressive damping device, an adjustable mechanical stop, and signal transmitting means.

BRIEF DESCRIPTION OF THE DRAWINGS

The invention will be described more specifically below with reference to the accompanying drawings, in which.

DESCRIPTION OF THE PREFERRED EMBODIMENT

Figure 1:
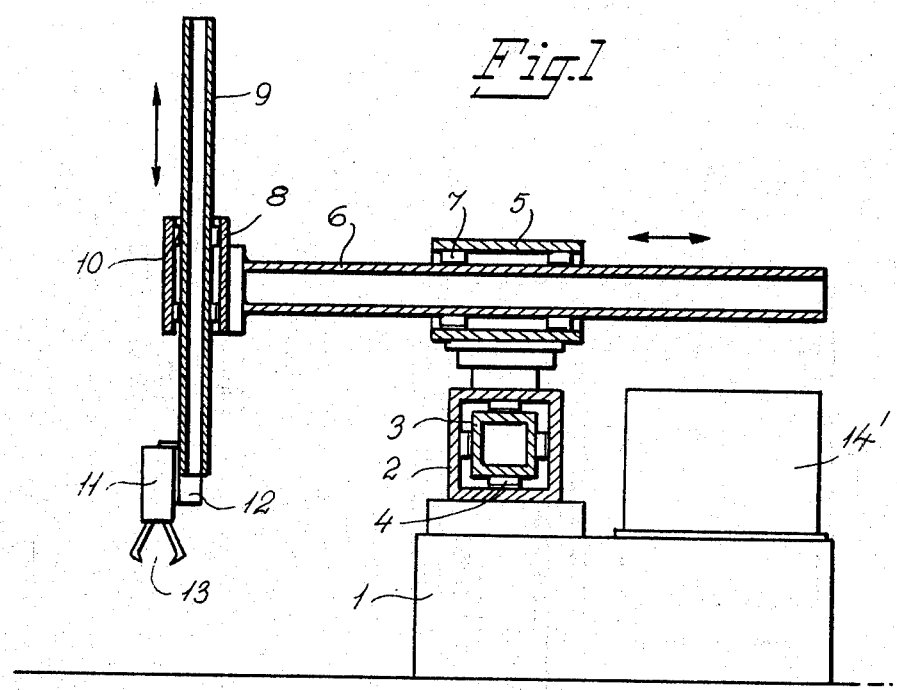
FIG. 1 shows an elevational cross section.
Figure 2:
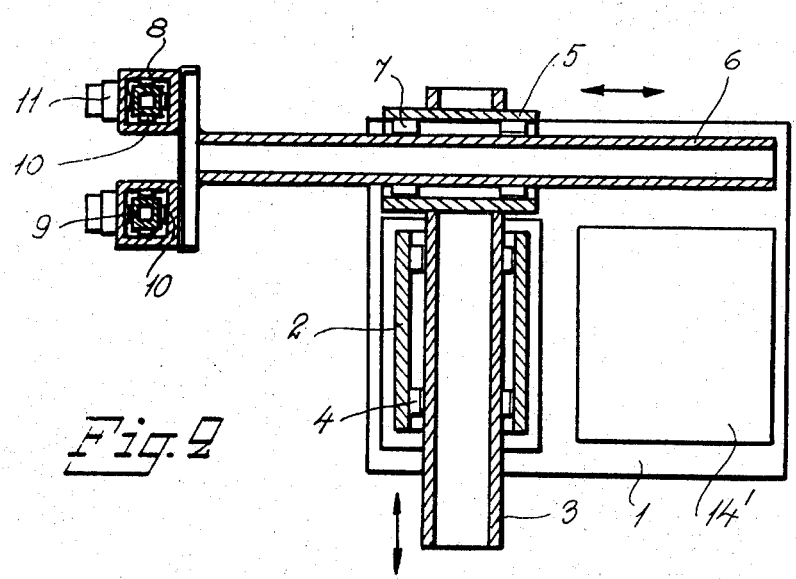
FIG. 2 shows a horizontal cross section of the movable units of the robot.

FIG. 1 shows an elevational cross section and FIG. 2 shows a horizontal cross section of the robot. For the sake of clarity, only the manner in which the arms or tubes of the robot are disposed has been illustrated in these figures. Thus, the pneumatic control cylinders of the respective arms and the damping, stop and signal transmitting units of the respective arms have been omitted. The robot is provided with control equipment which is positioned in a casing 14' on the base 1 of the robot, with said equipment including conventional valves and a program mechanism. An arm or a tube 2 of quadrangular cross section, for example square cross section, is horizontally and stationarily disposed on the base 1. Another arm or tube 3 of greater length than tube 2 and of a mating quadrangular cross section is disposed concentrically in said tube 2. Bearing means 4 are positioned between the respective side surfaces of the two tubes. Thereby tube 3 will become displaceable in a predetermined direction, say the x direction, with respect to tube 2 and with respect to the base.

Another tube 5, also of quadrangular cross section, is secured to tube 3 at right angles thereto. A tube 6 of greater length than tube 5 and of quadrangular cross section is disposed concentrically in said tube 5 with bearing means 7 being located between the respective side surfaces of the two tubes at each end of tube 5. In this manner the displaceable tube 6 will be movable in the y direction with respect to the base. A quadrangular tube 8, having its longitudinal direction disposed vertically, is secured to tube 6 at right angles at the end of said tube 6. A tube 9 of greater length than tube 8 is displaceable in said tube 8 through bearing means 10 in the same manner as tubes 3 and 6 in tubes 2 and 5, respectively, with tube 9 having a quadrangular cross section mating with that of tube 8. Thus tube 9 will be movable in the z direction. Gripping means 13, which are connected to mechanical control means 11 which in turn are connected to a pneumatic control cylinder 12, are provided at the end of tube 9. A plurality of parallel tubes 9, all displaceable in the z direction, may be disposed at the end of tube 6. FIG. 2 illustrates two tubes 9 in alignment with each other and located at right angles to the longitudinal direction of tube 6.

Figure 3:
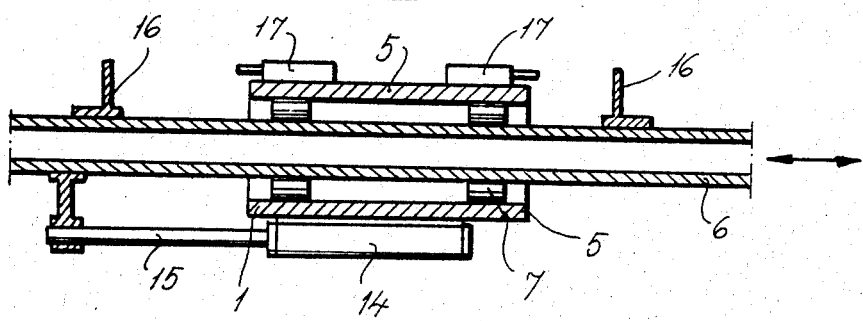
FIG. 3 illustrates the operating principle of the movable units.

As indicated above, the gripping means 13 are actuated by a pneumatic control cylinder 12. The general principle according to which the movements of the elongated tubes 3, 6 and 9 are carried out is illustrated in FIG. 3. Here tube 6 is shown positioned displaceably in tube 5 with bearing means 7 disposed between the tubes. A pneumatic control cylinder 14 is located close to tube 5, with tube 6 being connected to the end of the piston 15 associated with said pneumatic control cylinder. Thus, tube 6 may be displaced in a predetermined direction or in the opposite direction by the piston 15 being actuated. In order to limit the movements of tube 6 in the indicated directions, tube 6 is provided with shoulders 16 for engaging damping and stop means 17 disposed on tube 5. Engagement first occurs with the damper which promptly damps the movement so as to reduce the speed of the tube to practically zero when the shoulder strikes the stop. The other displaceable tubes 3 and 9 are disposed in similar manner in their respective tubes 2 and 8.

Figures 4, 5:
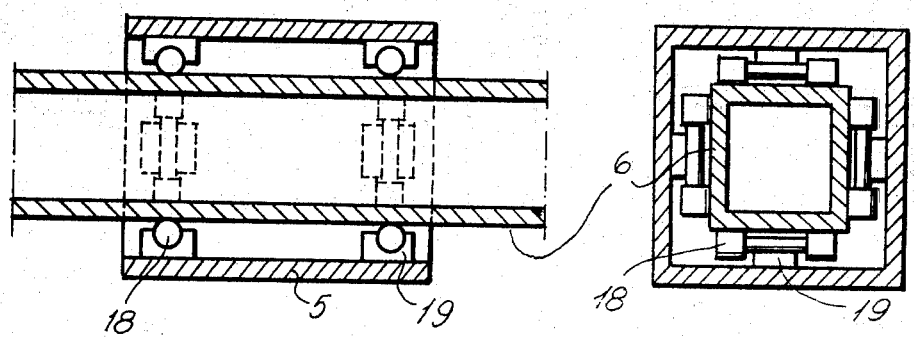
FIGS. 4 and 5 illustrate the mounting of the movable units and, FIGS. 6 and 7 show a combined damping and stop unit of the movable units in the robot.

FIGS. 4 and 5 illustrate the structure of the bearing means 4, 7 and 10. The bearing means of tubes 5 and 6 are shown as an example. FIG. 4 shows a longitudinal section of the tubes, and FIG. 5 shows a transverse section. As may be seen from these figures, bearing means are located at each end of the external tube 5 between each pair of side surfaces of the concentric tubes. Each bearing means consists of two rollers 18 which are disposed on support means 19 secured to the inner wall of the external tube 5. The rollers 18 engage the outer wall of the internal tube 6, whereas they go free from the inner wall of the external tube 5. Thus at each end of tube 5 there are four pairs of rollers mounted on the inside of the tube. The support means for two of these four pairs are secured stationarily to the wall, whereas the remaining support means 19 are resiliently disposed. Under the assumption that tube 6 is actuated by a force at right angles to the longitudinal direction of said tube and effective in the portion of the tube lying to the right of tube 5 in FIG. 4, the resilient rollers of the respective ends are positioned in such manner as to lie diagonally with respect to each other. Thus, in FIG. 4 the respective upper right and lower left roller pairs 18 are positioned resiliently. This provides such mounting of the displaceable tube that it will not be affected either when the movable arm is subjected to a bending stress nor when it is subjected to a torsion stress. The remaining tubes are mounted in similar manner.

Figure 6:
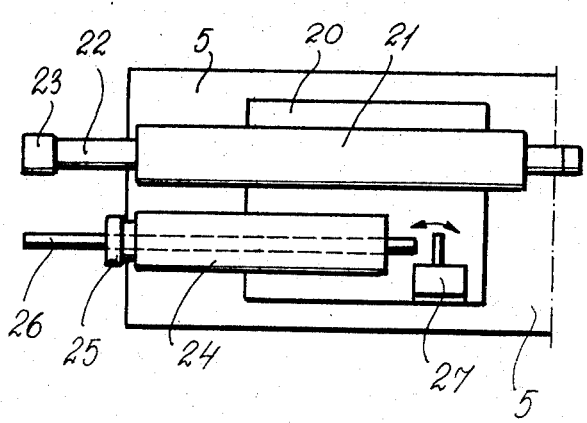
Figure 7:
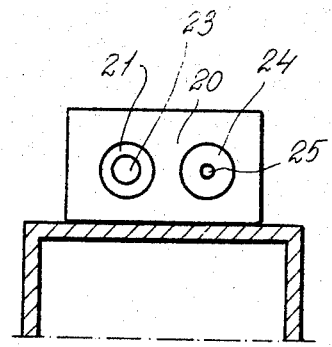

The damping means 17 with their associated stop means may be of conventional type, with an example being illustrated in FIGS. 6 and 7. FIG. 6 shows the damping means as viewed from above and FIG. 7 shows them as viewed from that side on which the shoulder 16 strikes said means. The damping means include a block 20 that is disposed on tube 5. The block 20 encloses a damping device 21 and a stop device 24. The damping device or damper 20 comprises a piston 22 having its end provided with a buffer 23 of resilient material. This buffer serves the purpose of providing soft and silent engagement with the end of piston 22. The damper may preferably operate progressively, i.e., with its damping characteristic following that of a parabola. The dampers may to advantage be so-called silicon dampers which have a damping characteristic of the indicated nature. Furthermore, the damping capacity of the damper may preferably be variable within predetermined limits. When the shoulder 16 of tube 6 strikes the piston, the damper is to decrease the kinetic energy of the tube so that its accelerative force becomes as small as possible. This is achieved to a great extent with the mentioned type of damper, as the latter does not generate any return energy but converts energy into heat.

As has been mentioned, the block 20 also contains a stop device 24, which is provided with an adjustable end portion 25, by means of which the engagement surface of the device may be set to a desired position. The block also contains signal transmitting means including a rod 26 which is displaceable in the device 24, with the end of said rod that is located outside of said block being disposed for engagement by shoulder 16 and with its opposite end being adapted to actuate a signal transmitter, such as a microswitch 27. The rod 26 is provided with a return spring which returns the rod to its initial position. This position may be adjusted such, that the shoulder 16 will engage the rod 26 at the same time as it engages the end of the damper piston. In this manner the control equipment will immediately receive a signal.

Thus, the movable units are provided with signal transmitting means for transmitting a signal to the central control unit upon the termination of the movement of the respective movable unit, with said control unit comprising a program mechanism that is designed such, that it senses the state of the signal transmitting means before each new cycle of operation, with the operative process being discontinued if said state proves to be incorrect. Furthermore, the program mechanism is designed such, that external actuation of the signal transmitting means cannot affect the operative process. When a signal enters the central unit it is cut off immediately, and an indication is transmitted for example to the magnetic valve for actuating the control cylinder that is to provide the next movement. Thereafter the program mechanism will be prepared to receive the signal that is transmitted in the termination of the next movement.

The system described above has made it possible to provide a robot actuated by limited forces but still operating at high speed and being designed such, that it stops its movement in response to a predetermined counterforce. As the result of the described bearing means, a movement is achieved, which is absolutely free from play in all directions, irrespective of how the forces actuate the control arms and irrespective of if a bending stress or a torsion stress occurs. Furthermore, it is simple to set the movement-limiting stops to arbitrary positions so as to determine the engagement positions. Also, very prompt and effective damping of the high-speed movements of the tubes is achieved by the utilized damping means.

The invention is not restricted to the embodiment that is described above, and various modifications may naturally be carried out within the scope of the invention. For example, the individual bearing means may be made differently in their various portions. Furthermore, it is feasible to have the shoulders and the damping and stop means, respectively, change places, so that the shoulder will be located on the external tube and the damper on the movable internal tube.

I claim:
1. A rectilinear robot system comprising
a plurality of rectilinear telescoping robot arm units, each including an elongated internal tube extending through a shorter external tube, said units being oriented in three coordinate axes,
bearing means located at each end of the external tube between the opposing surfaces of the respective tubes,
drive means for individually displacing said elongated internal tube longitudinally within said external tube, longitudinal motion damping means associated with at least one of said arm units, said damping means including a unit comprising a progressive damping means, adjustable stop means, and an electrical signal transmitting device positioned on one of said tubes and operated in synchronism with said stop means, and shoulder means located on the other one of said tubes for mechanically engaging the last-mentioned unit when said drive means are operative for damping the stopping motion and sending said signal.

2. A robot system in accordance with claim 1, wherein said plurality of robot units include three of said units individually located in the $x$, $y$ and $z$ directions of a Cartesian coordinate system.

3. A robot system in accordance with claim 1, wherein the internal and external tubes, respectively, have quadrangular cross sections mating with each other and being concentrical to each other.

4. A robot system in accordance with claim 3, wherein each bearing means comprises a pair of rollers for engaging the outer wall of the internal tube disposed in support means secured to the inner wall of the external tube.

5. A robot system in accordance with claim 4, wherein four roller pairs are located at each end of the quadrangular external tube for supporting the internal tube, each pair of the rollers being disposed between mating sides of the respective internal and external tubes, and wherein two of the four roller pairs at each end of the external tube are positioned resiliently, whereas the remaining two are stationarily secured to the external tube.

6. A robot system in accordance with claim 5, wherein the resilient pairs of rollers are located diagonally in the bearing means at the respective ends of the external tubes, as viewed in the longitudinal direction of the tubes.

7. A robot system in accordance with claim 1, wherein each drive means comprises a pneumatic cylinder.

8. A robot system in accordance with claim 1, wherein in said unit comprising a progressive damping device, adjustable stop means, and a signal transmitting device, said adjustable stop means are disposed parallel to said progressive damping device and are provided with an adjustable engagement end and include an elongated rod mounted for being displaced in its longitudinal direction for actuating a signal transmitter incorporated in said unit, with said progressive damping device and said adjustable stop means being enclosed in a common block.

* * * * *